United States Patent [19]
McAllister

[11] 3,919,664
[45] Nov. 11, 1975

[54] OPTICAL OSCILLATOR-AMPLIFIER LASER CONFIGURATION

[75] Inventor: Gary Lee McAllister, Palos Verdes Peninsula, Calif.

[73] Assignee: Northrop Corporation, Los Angeles, Calif.

[22] Filed: June 27, 1974

[21] Appl. No.: 483,687

Related U.S. Application Data

[63] Continuation-in-part of Ser. No. 325,939, Jan. 22, 1973, abandoned.

[52] U.S. Cl. ........................................... 331/94.5 C
[51] Int. Cl.² ........................................... H01S 3/08
[58] Field of Search ................... 331/94.5; 330/4.3; 356/106

[56] References Cited
UNITED STATES PATENTS

3,622,907   11/1971   Tomlinson et al. ............ 331/94.5 C
3,681,709   8/1972   Brown ........................... 331/94.5 C

*Primary Examiner*—William L. Sikes
*Attorney, Agent, or Firm*—Edward A. Sokolski

[57] ABSTRACT

A laser has incorporated therein an oscillator formed by a pair of mirrors, at least one of the mirrors being positioned outside of the envelope. The mirrors are dimensioned and spaced from each other so that the resonator has a relatively low Fresnel number and is operated unstably. The entire surface of one of these mirrors is convex and diffracts a portion of the energy outside of the oscillator region. Also incorporated into the laser is an amplifier region defined by a separate pair of mirrors which receive the energy diffracted from the oscillator region. The second pair of mirrors form an optical system with a high Fresnel number. A filter, modulator or other control for the laser signal may be placed outside the laser envelope in the optical path of the oscillator.

6 Claims, 2 Drawing Figures

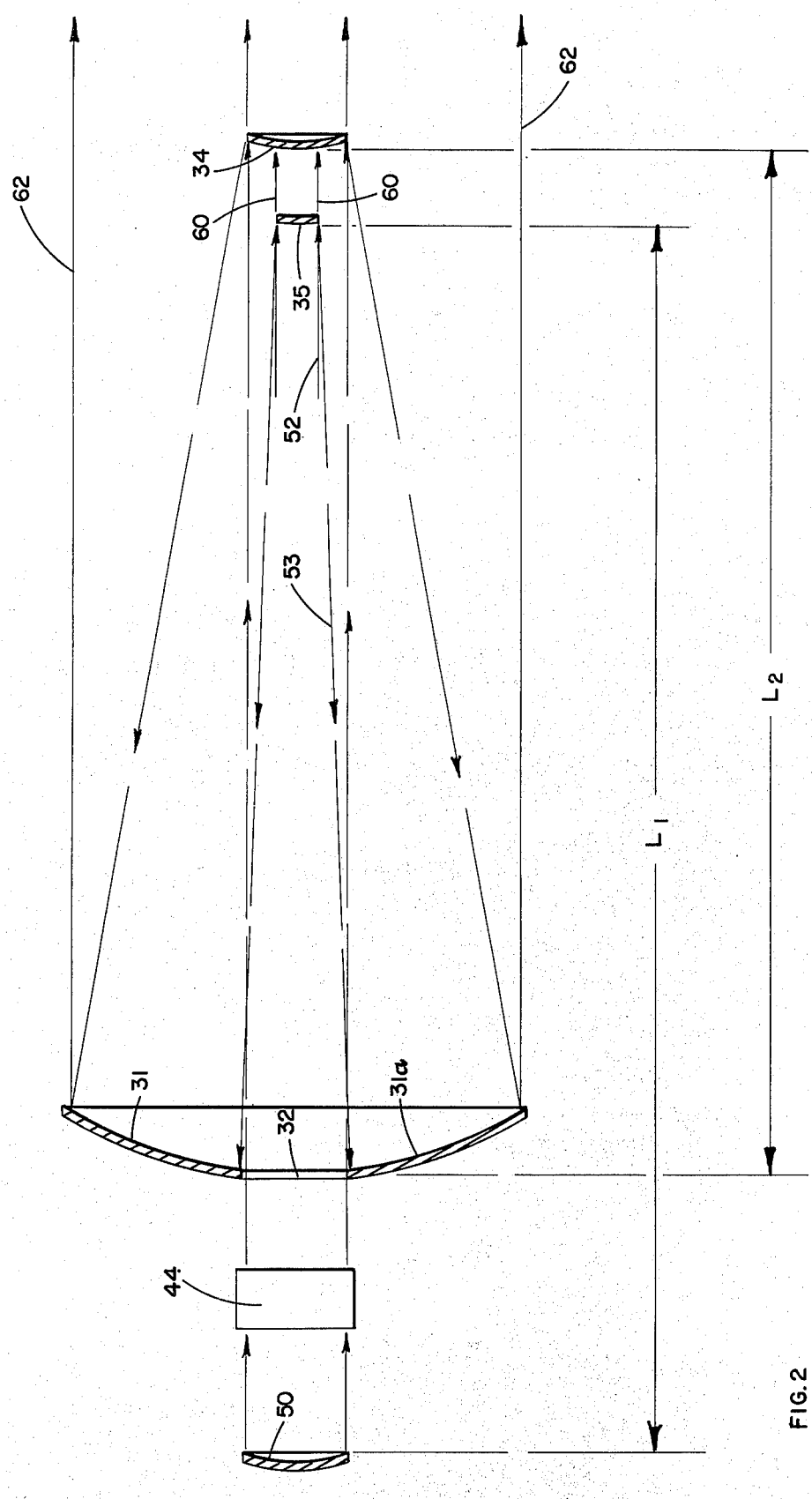

OPTICAL OSCILLATOR-AMPLIFIER LASER CONFIGURATION

This application is a continuation-in-part of my application Ser. No. 325,939, filed Jan. 22, 1973, and now abandoned.

This invention relates to lasers, and more particularly to such a device employing an oscillator-amplifier configuration formed by paired mirrors.

Lasers often employ resonators or oscillators formed from pairs of mirrors which are appropriately positioned relative to each other. Laser configurations have been developed, such as described in U.S. Pat. No. 3,622,907, wherein such a laser oscillator is utilized in conjunction with a second pair of mirrors defining an amplifier region; the spill-over energy from the oscillator being amplified in the amplifier region. In this device, the oscillator is operated stably between a flat faced portion of a first mirror and a concave portion of a second mirror. The first mirror has an outer convex portion from which a portion of the oscillator is diffracted to the outer portions of the second mirror. Also in this design, both of the mirrors for the oscillator are contained within the laser envelope. This somewhat limits the versatility of operation in that filters, modulators or other control devices, if they are to be interposed in the optical path of the composite device, must generally be placed inside the laser envelope to be effective. Such modulators or control devices would also have to be the size of the full laser area.

In high power lasers, such as described in *Physics Today* for Jan., 1972 (pp 17 and 18), *Applied Physics Letters* for Dec. 15, 1971 (pp 506–508) and *Applied Physics Letters* for Sept. 1, 1972, it has been found that due to the very large Fresnel numbers which this type of device generally has, undesirable mode patterns are developed. The device of this invention, in view of the low Fresnel number of its oscillator, can be utilized to effectively control the beam profile for such high power lasers, eliminating the aforementioned undesirable mode patterns. The optical system in the amplifier region can be designed with a high Fresnel number or, as a matter of fact, any Fresnel number for optimum use with high volume lasers. The device can be designed to couple out a wide range of beam sizes or intensities from the oscillator.

Referring to the drawings,

FIG. 2 is a diagrammatic view illustrating the operation of the device of the invention.

Figure 1:
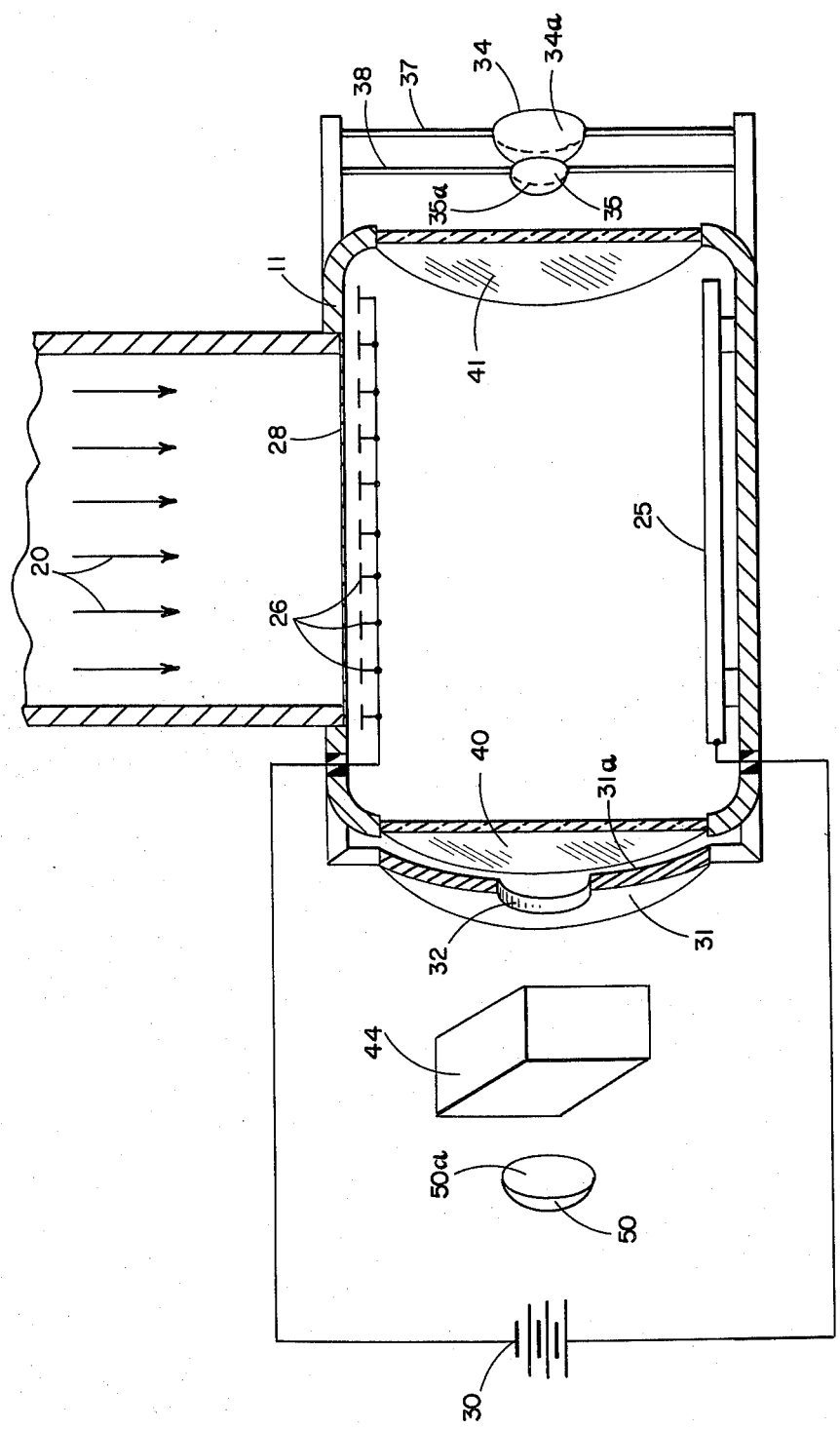
FIG. 1 is a schematic view illustrating one embodiment of the invention.

Briefly described, the device of the invention is as follows:

A laser which may be of the gas type having an envelope, with an appropriate gaseous mixture therein for implementing the lasing action, has an oscillator formed from a pair of mirrors. At least one of these mirrors may be positioned outside the laser envelope, there being an appropriate window formed in the end of the envelope to afford optical paths between the two mirrors. The mirrors are designed and positioned to form an unstable resonator, one of the mirrors being convex such that energy is diffracted therefrom and injected into an amplifier region defined by a second pair of mirrors. In the illustrative embodiment, the oscillator is designed to have a low Fresnel number so that it can effectively eliminate undesirable mode patterns which would otherwise be present in the laser output.

The optical system formed in the amplifier region in the preferred embodiment typically has a very large Fresnel number. Optical filters for passing only selected lines or bands in the oscillator output may be placed as desired outside of the laser envelope in the optical path between the laser envelope and the externally positioned oscillator mirror. Also, the laser beam can be modulated or otherwise controlled by control devices placed in such an external location.

Referring now to FIG. 1, one embodiment of the invention is schematically illustrated. This device is a relatively high power laser that utilizes a gaseous mixture which may comprise carbon dioxide or carbon monoxide, nitrogen, and helium which is pumped into laser envelope 11. The gas within envelope 11 is ionized by means of electron beam 20 to initiate and control the discharge in the gas, in the manner described in the aforementioned articles in *Physics Today* and *Applied Physics Letters*. The electron beam passes into the envelope through thin metallic membrane 28 which forms a wall of the envelope. A high voltage potential is placed by means of power source 30 between anode 25 and cathode 26. Optically transparent windows 40 and 41 are installed in the opposite ends of envelope 11.

Installed opposite window 40 is mirror 31 which is in the shape of a spherical dish having a circular aperture 32 in the center thereof. Dish shaped spherical mirrors 34 and 35 are installed opposite window 41 on appropriate support brackets 37 and 38 respectively. Placed opposite mirror 31 on an appropriate support (not shown) is a beam control device 44 which may comprise a water cell filter, a grating filter or a beam modulator. Installed on appropriate support means (not shown) opposite control device 44 is spherical dish-shaped mirror 50. Mirror 50 has a concave reflective surface 50a facing towards control device 44, while mirror 31 has a concave reflective surface 31a facing towards mirrors 34 and 35; the back portion of mirror 31 facing towards mirror 50 being substantially non-reflective. Mirrors 34 and 35 have convex reflective surfaces 34a and 35a facing towards the reflective surface 31a of mirror 31.

Referring now to FIG. 2, the operation of the device of the invention is schematically illustrated. Mirrors 35 and 50 form an unstable resonator with resonant lasing action occurring between the mirror surfaces, as indicated by arrows 52 and 53. Control device 44 which may comprise a water cell, is interposed between window 32 and mirror 50 and acts as a band pass filter which passes only desired vibrational bands or lines.

A certain amount of the laser energy is coupled out onto mirror 34 as indicated by arrows 60. This energy is reflected from mirror 34 onto mirror 31, these two mirrors defining an amplifier region. The optical energy is reflected by mirror 31 to provide the laser output, as indicated by arrows 62. The system is designed to provide an optimum Fresnel number for the particular application requirements at hand. For certain high power lasers it is desirable to have a low Fresnel number for the oscillator to eliminate undesirable mode patterns. Fresnel number, $N$, is defined as follows:

$$N = \frac{a^2}{L} \qquad (1)$$

where $a$ is the radius of the mirrors used, L is the distance between mirrors as shown in FIG. 2 and $\lambda$ is the wavelength of the emitted energy.

For a typical design to be used with a high power carbon monoxide ($\lambda \approx 5\mu$) laser, the following parameters may be used:

$L_1 = 2.50$m, $L_2 = 1.50$m, mirror 50: Radius of curvature $R_1 = 6.67$m; diameter, $a_1 = .816$cm mirror 35: Radius of curvature, $R_3 = 1.67$m; diameter, $a_3 = .204$cm mirror 31: Radius of curvature, $R_2 = 3.60$cm; diameter, $a_2 = 4.90$cm mirror 34: Radius of curvature, $R_4 = .60$m; diameter, $a_4 = .816$cm These parameters give an equivalent Fresnel number, "Neq" of .5 for the oscillator which is desirable for good mode properties, a geometrical magnification of 4 and a theoretical coupling coefficient of 0.80.

$$\text{Neq} = \frac{N(M1)}{2M^2} \qquad (2)$$

where $M$ is the geometrical magnification.

Mirrors 31 and 34 form a two-pass optical system which encompasses a total volume of approximately 1 liter. A gain coefficient of 0.001 cm$^{-1}$ would be sufficient to reach oscillation threshold in the inner oscillation region.

The device of this invention thus provides a simple, yet highly effective means for facilitating the control of the operation of a laser. While the device of the invention has been described and illustrated in detail, it is to be clearly understood that this is intended by way of illustration and example only and is not to be taken by way of limitation, the spirit and scope of this invention being limited only by the terms of the following claims.

I claim:

1. In a laser having an envelope, means for initiating lasing action within said envelope, an optical oscillator for establishing unstable resonant oscillation of the lased energy, said oscillator comprising a first pair of mirrors placed opposite each other, the entire reflective surface of one of said mirrors being convex, a portion of the lased energy being reflected back and forth between said mirrors and a portion of the lased energy being diffracted by said convex mirror outside the reflection area of the other of said mirrors, at least one of said first pair of mirrors being mounted outside the laser envelope, and an amplifier region defined by a second pair of oppositely placed mirrors, one of the mirrors of said second pair having a reflective surface positioned to receive the energy diffracted outside the reflection area of the other of said oscillator mirrors, lased energy being reflected from said one mirror of said second pair to the other mirror of the second pair, back to said one mirror of said second pair and thence coupled outside the optical system.

2. The device of claim 1 wherein the other of the mirrors of said first pair and one of the mirrors of the second pair has a concave spherical reflective surface facing its paired mirror, the other of the mirrors of the second pair having a convex spherical reflective surface facing its paired mirror.

3. The device of claim 2 wherein said one mirror of said second pair is mounted opposite one end of said envelope, is located between said oscillator mirrors and has an aperture formed therein, whereby light reflected between said oscillator mirrors passes through said aperture.

4. The device of claim 3 and further including means for controlling the laser beam interposed between said oscillator mirrors and mounted outside the laser envelope.

5. The device of claim 4 wherein said controlling means comprises a water cell for filtering the laser beam.

6. The device of claim 1 wherein all of said mirrors are mounted outside the laser envelope, and further including transparent windows at opposite ends of said envelope.

* * * * *